United States Patent
Wang

(10) Patent No.: US 12,504,786 B2
(45) Date of Patent: Dec. 23, 2025

(54) SCREEN EXTENDER

(71) Applicant: SHENZHEN BAIJIAYOUPU TECHNOLOGY CO., LTD., Shenzhen (CN)

(72) Inventor: Xiaogang Wang, Shenzhen (CN)

(73) Assignee: SHENZHEN BAIJIAYOUPU TECHNOLOGY CO., LTD., Shenzhen (CN)

( * ) Notice: Subject to any disclaimer, the term of this patent is extended or adjusted under 35 U.S.C. 154(b) by 139 days.

(21) Appl. No.: 18/418,372

(22) Filed: Jan. 22, 2024

(65) Prior Publication Data
US 2024/0241537 A1    Jul. 18, 2024

Related U.S. Application Data

(63) Continuation-in-part of application No. PCT/CN2023/072118, filed on Jan. 13, 2023.

(51) Int. Cl.
*G06F 1/16*    (2006.01)

(52) U.S. Cl.
CPC .......... *G06F 1/1647* (2013.01); *G06F 1/1654* (2013.01)

(58) Field of Classification Search
CPC .... G06F 1/1647; G06F 1/1654; G06F 1/1649; G06F 1/1632
See application file for complete search history.

(56) References Cited

U.S. PATENT DOCUMENTS 7,283,353 B1 * 10/2007 Jordan ................. H04N 5/64
                                                         345/1.3
11,487,328 B1 * 11/2022 Gu ..................... G06F 1/1683
2019/0003638 A1 * 1/2019 Bertelle ............... G06F 1/1632

FOREIGN PATENT DOCUMENTS

| CN | 209859043 U | 12/2019 |
| CN | 214147139 U | 9/2021 |
| CN | 114576486 A | 6/2022 |
| CN | 219036210 U | 5/2023 |
| CN | 219692704 U | 9/2023 |
| NL | 1019354 C2 | 5/2003 |
| WO | 2017042970 A1 | 3/2017 |

OTHER PUBLICATIONS

International Search Report issued in corresponding International application No. PCT/CN2023/072118, mailed Jun. 24, 2023.
Written Opinion of the International Search Authority in corresponding International application No. PCT/CN2023/072118, mailed Jun. 24, 2023.

* cited by examiner

*Primary Examiner* — James Wu

(57) ABSTRACT

A screen extender includes a first support and a second support. The first support is connected to the second support. The first support and the second support are pullable with respect to each other. A first accommodating cavity is defined in the first support. A second accommodating cavity is defined in the second support. The first accommodating cavity and the second accommodating cavity are combined to form a screen storage chamber. At least one connecting assembly is arranged on at least one of the first support and the second support. The at least one connecting assembly is detachably connected to a screen. The first accommodating cavity and the second accommodating cavity form the screen storage chamber, so when the screen is not in use, the screen is detached from the at least one connecting assembly and is accommodated in the screen storage chamber.

20 Claims, 8 Drawing Sheets

SCREEN EXTENDER

TECHNICAL FIELD

The present disclosure relates to a field of screen extenders and in particular to a screen extender with a screen storage chamber.

BACKGROUND

In the prior art, after using a screen extender, there are generally two ways to store screens thereof. A first storage method is to separate brackets of the screen extender from the screens, and put the screens into a leather case or a velvet bag. A second storage method is to store the screens directly in the screen extender by pulling the screen extender, folding the screen extender, etc.

In the above two storage methods, the first storage method requires separating the brackets from the screens, and then using the additional leather case or the velvet bag to store the screens, which occupies limited work space, is inconvenient to carry, and provides a poor experience. The second storage method is to store the screens directly in the screen extender. However, when the screen extender shakes, the screens shake with it, which easily damages the screens. Moreover, the screen extender only adapts to a specific laptop size and cannot fit all sizes of laptops. In practical applications, the screen extender brings poor use experience, the screens are easy to break. Therefore, a more reasonable screen extender is needed.

SUMMARY

In view of defects in the prior art, the present disclosure provides a screen extender with a screen storage chamber. The screen extender comprises a first support and a second support.

The first support is connected to the second support. The first support and the second support are pullable with respect to each other. A first accommodating cavity is defined in the first support. A second accommodating cavity is defined in the second support. The first accommodating cavity and the second accommodating cavity are combined to form the screen storage chamber. At least one connecting assembly is arranged on at least one of the first support and the second support. The at least one connecting assembly is detachably connected to a screen.

In one optional embodiment, sliding rods and sliding grooves are arranged on the first support and the second support. A first sliding rod and a first sliding groove matched with the first sliding rod are arranged on the first support. A second sling rod and a second sliding groove matched with the second sliding rod are arranged on the second support. The first sliding rod and the first sliding groove form a first unit. The second sliding rod and the second sliding groove form a second unit. The first unit and the second unit are respectively located on two sides of the screen storage chamber.

In one optional embodiment, gear grooves are defined on an outer surface of each of the sliding rods. An elastic positioning piece is arranged on an inner wall of each of the sliding grooves. Each elastic positioning piece is configured to be limited in one of the gear grooves of a corresponding sliding rod.

In one optional embodiment, the first support and the second support are arranged side by side. A side surface of the first support and a side surface of the second support are inclined surfaces. An inclined direction of the side surface of the first support is consistent with an inclined direction of the side surface of the second support. The first accommodating cavity and the second accommodating cavity are respectively defined on the two inclined surfaces.

In one optional embodiment, self-locking buckles are arranged at an inner bottom of the first accommodating cavity and an inner bottom of the second accommodating cavity. A locking piece matched with any one of the self-locking buckles is arranged at one end of the screen.

In one optional embodiment, the screen storage chamber is capable of accommodating screens by stacking the screens along a vertical direction. Correspondingly, the self-locking buckles are vertically distributed.

In one optional embodiment, at least one battery assembly configured to supply power is arranged on the first support and/or the second support.

In one optional embodiment, the at least one connecting assembly comprises a connecting base and a connecting arm. The connecting arm is movably connected to the connecting base. The connecting arm is detachably connected to the screen. The connecting base is connected to the first support or the second support.

In one optional embodiment, the connecting base is horizontally and rotatably connected to the connecting arm through a first rotating shaft. The connecting base is vertically and rotatably connected to the first support or the second support through a second rotating shaft.

In one optional embodiment, a positioning groove configured to position the screen is defined on the connecting arm. One or more hooks are arranged in the positioning groove. The screen is hung through the one or more hooks. One or more hooking holes matched the one or more hooks are defined on a side surface of the screen.

Alternatively, the connecting arm defines a clamping groove configured to clamp the screen, and the screen is attached to an inner wall of the clamping groove by static friction force.

In one optional embodiment, at least one bracket is arranged on the first support and/or the second support. The at least one bracket is foldable and unfoldable.

In one optional embodiment, the first support comprises a first support body and a first support casing. The second support comprises a second support body and a second support casing.

The first accommodating cavity is defined on an upper end of the first support body. The first support casing covers the first accommodating cavity. The first support casing is detachably connected to the first support body.

The second accommodating cavity is defined on an upper end of the second support body. The second support casing covers the second accommodating cavity. The second support casing is detachably connected to the second support body.

In the screen extender, the first accommodating cavity defined by the first support and the second accommodating cavity defined by the second support form the screen storage chamber. When the screen is not in use, the screen is detached from the at least one connecting assembly and put into the screen storage chamber for storage. The first support and the second support are pullable with respect to each other, so the screen storage chamber is adapt to the screens having different sizes. Alternatively, the screen is taken out and installed on the at least one connecting assembly and servers as the screen extender. When used as the screen extender, an overall width of the screen extender is adjusted through the first support and the second support. When two screens are respectively installed on the first support and the second support, a space between the two screens are adjusted through the first support and the second support. An overall structure of the screen extender is reasonable and compact, functions thereof are rich and diverse, and application flexibility thereof is high. Further, it is very convenient to use and store the screen extender, and the screen extender provides good protection for the screens when the screens are received in the screen extender.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

DETAILED DESCRIPTION

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
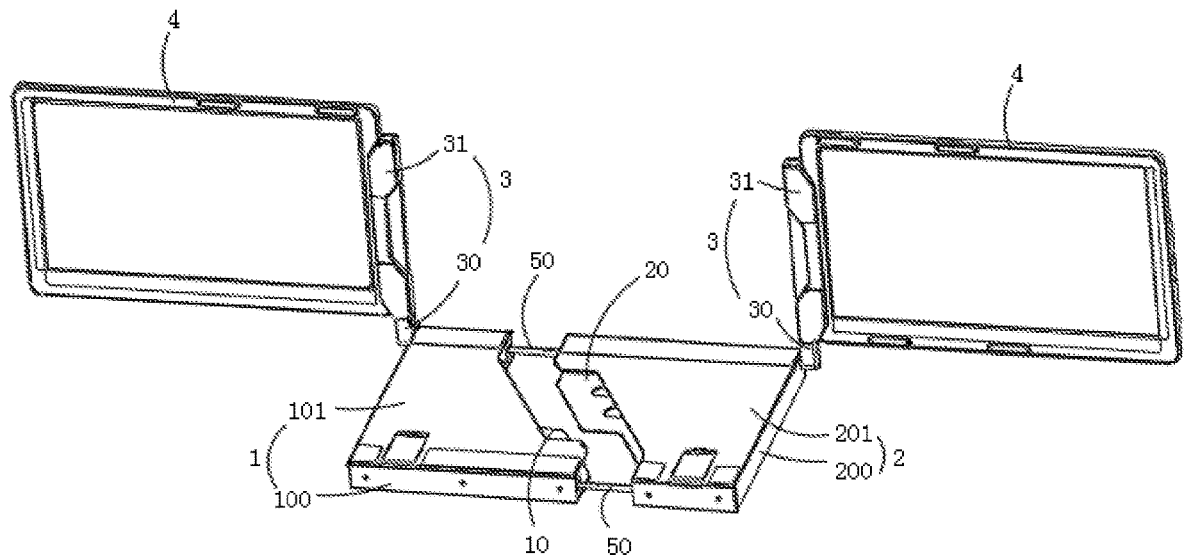
FIG. 1 is a schematic diagram of a screen extender according to one embodiment of the present disclosure, where the screen extender is shown in an unfolded state.
Figure 2:
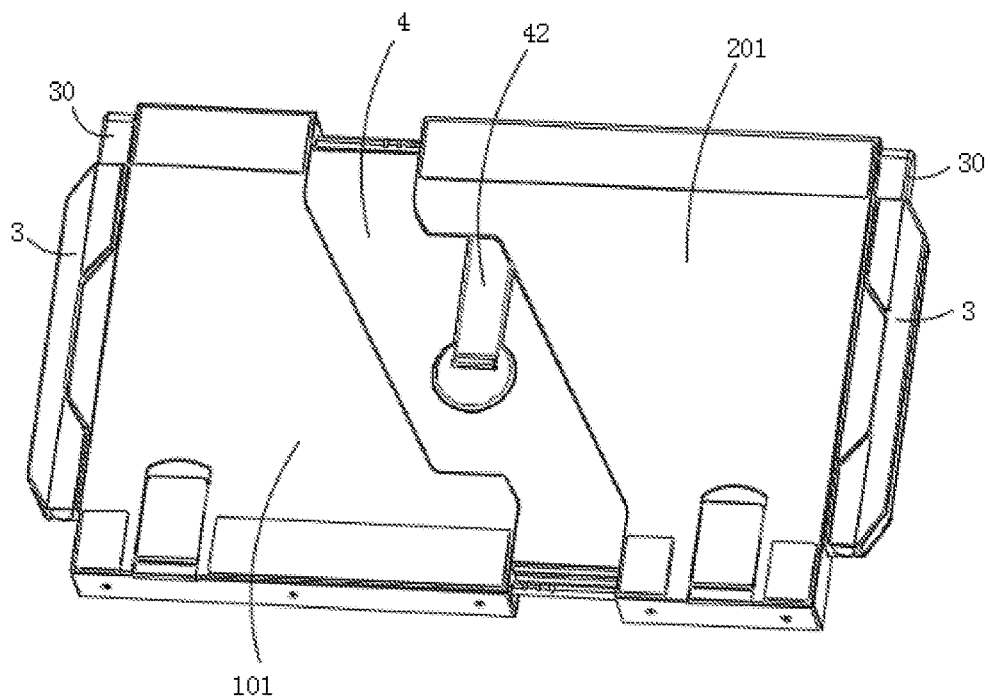
FIG. 2 is a schematic diagram of the screen extender according to one embodiment of the present disclosure, where the screen extender is shown in a folded state.
Figure 3:
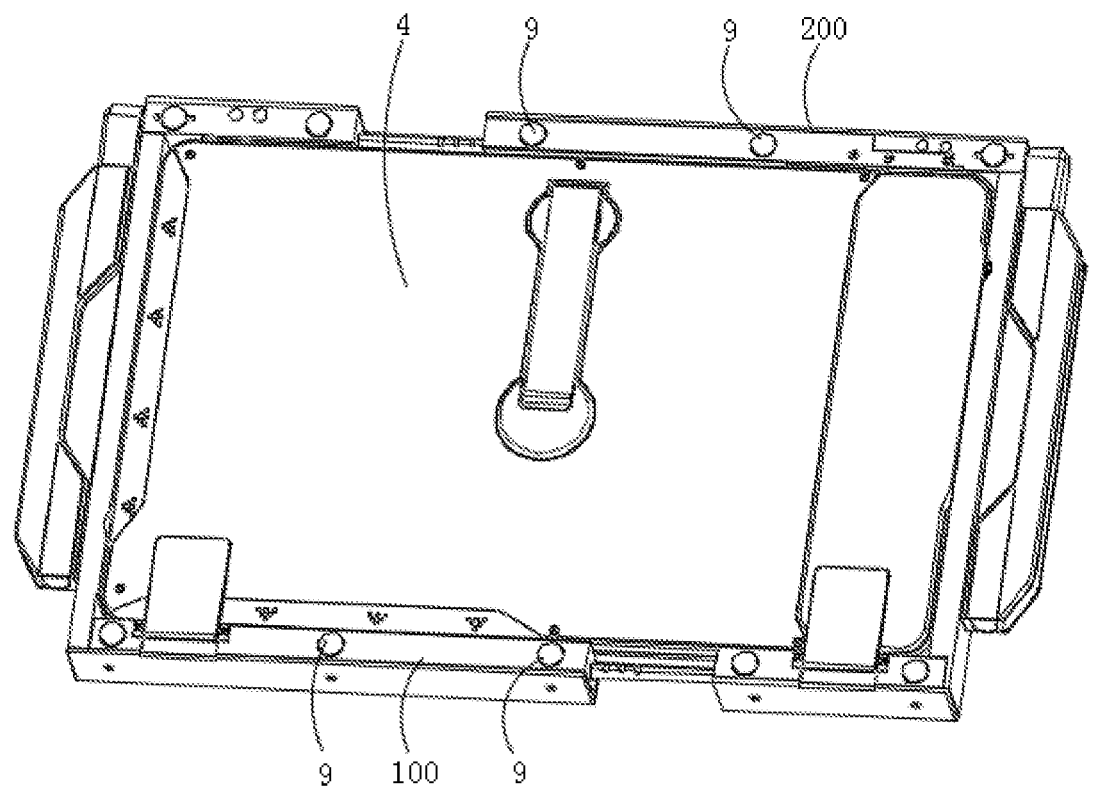
FIG. 3 is a schematic diagram of an interior of the screen extender according to one embodiment of the present disclosure.
Figure 4:
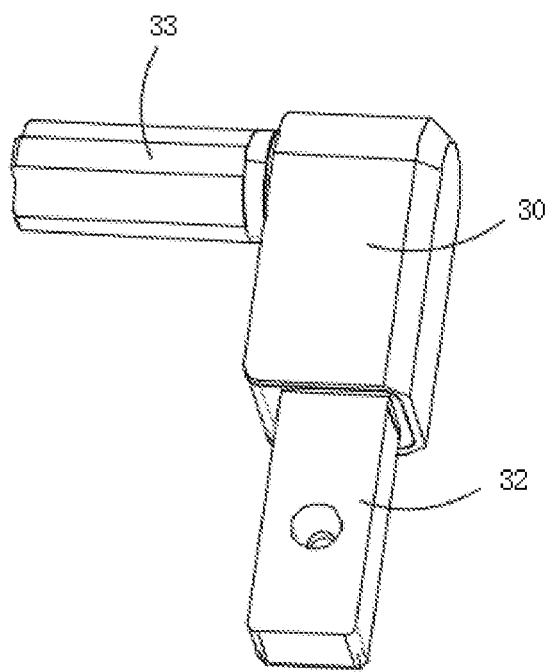
FIG. 4 is a schematic diagram of a connecting base of the screen extender according to one embodiment of the present disclosure.
Figure 5:
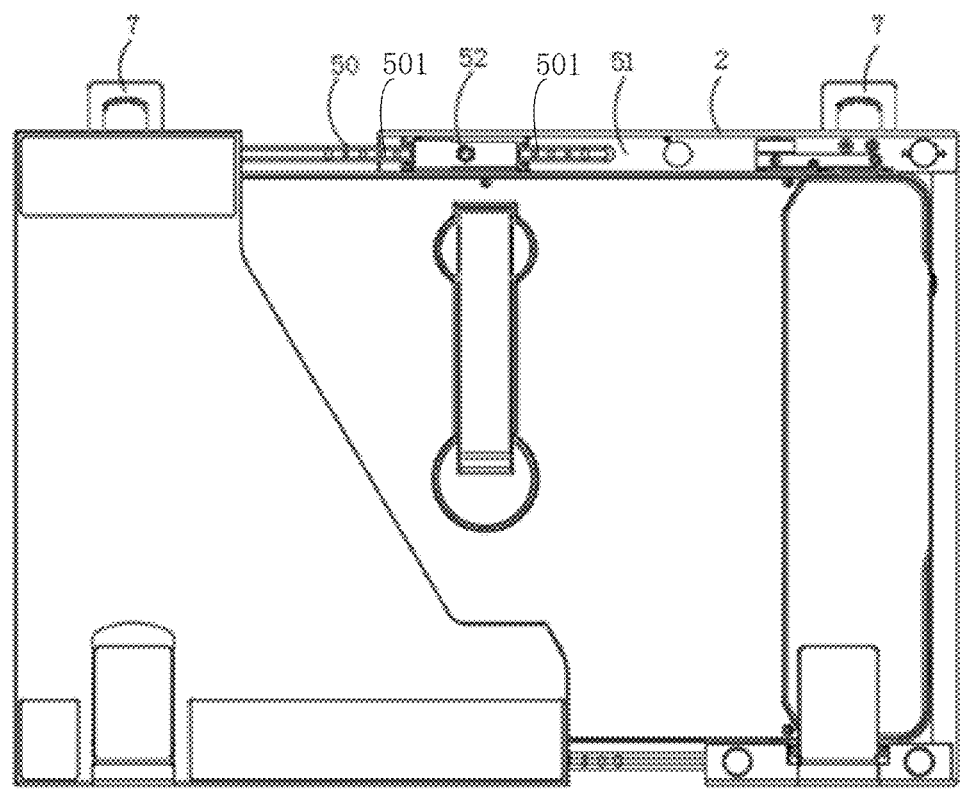
FIG. 5 is a schematic diagram of sliding rods and sliding grooves of the screen extender according to one embodiment of the present disclosure.
Figure 6:
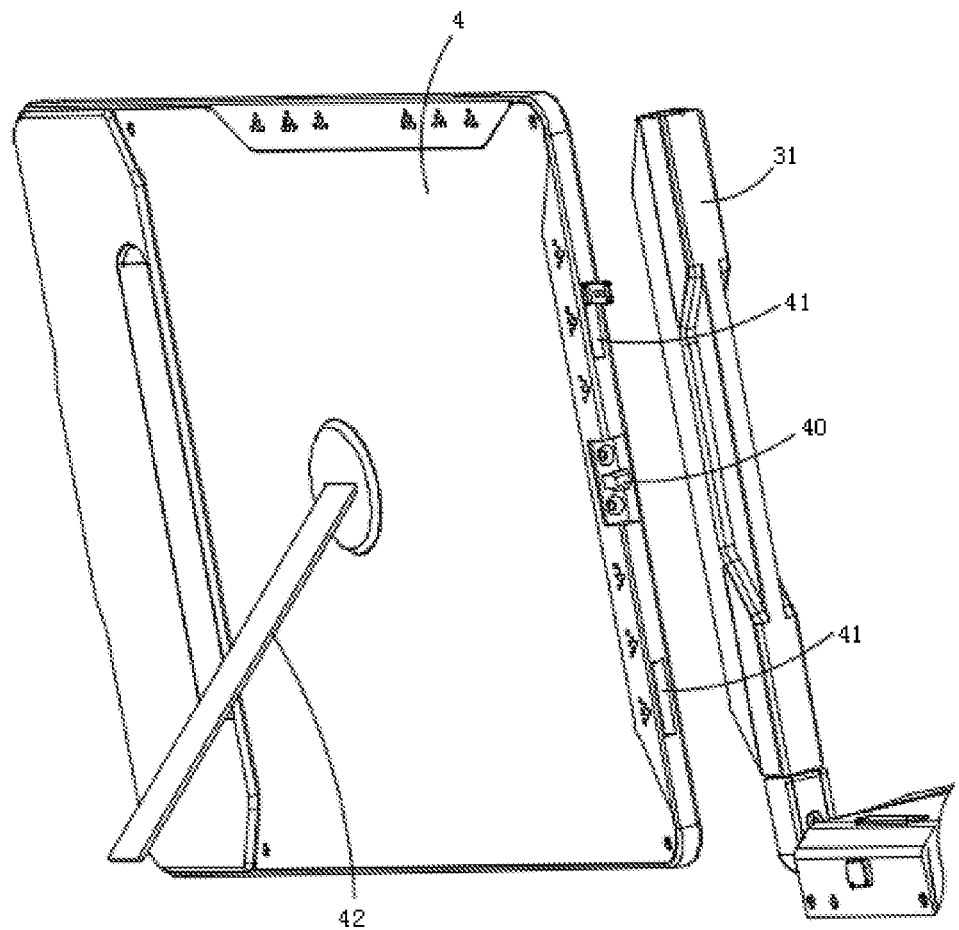
FIG. 6 is a schematic diagram of a connecting assembly and a screen of the screen extender according to one embodiment of the present disclosure, where the connecting assembly is separated from the screen.
Figure 7:
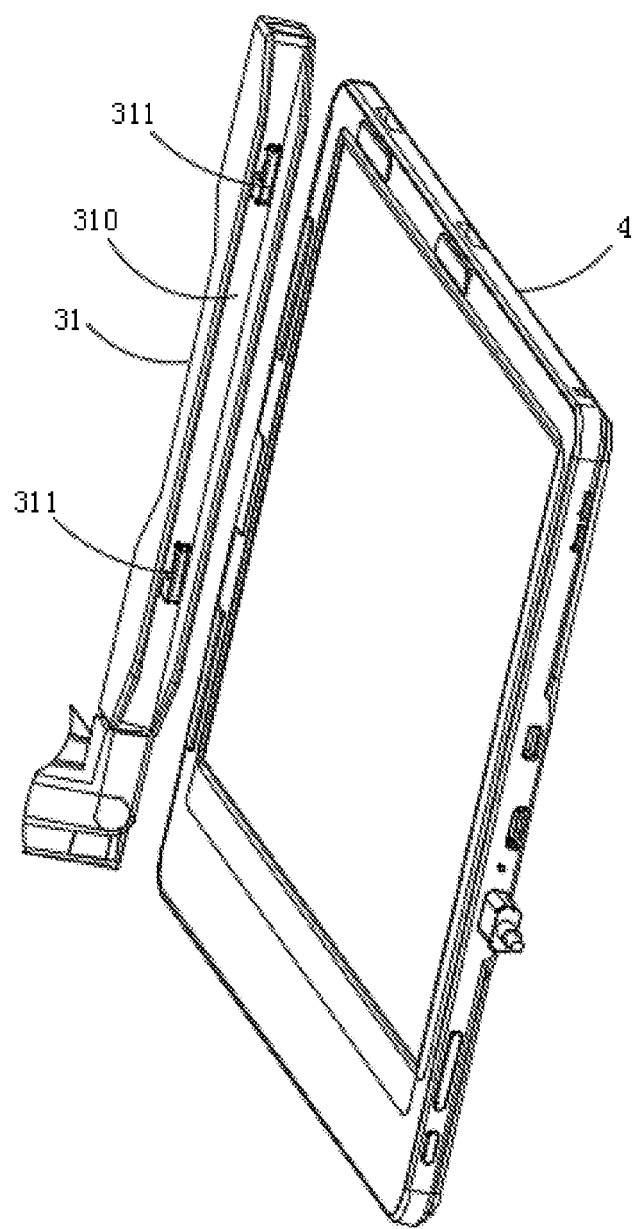
FIG. 7 is another schematic diagram of the connecting assembly and the screen of the screen extender according to one embodiment of the present disclosure, where the connecting assembly is separated from the screen.
Figure 8:
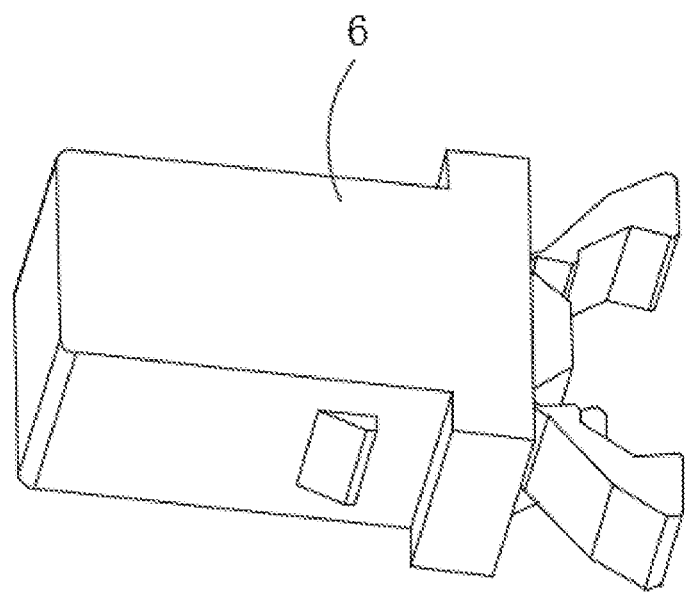
FIG. 8 is a schematic diagram of a self-locking buckle of the screen extender according to one embodiment of the present disclosure.
Figure 9:
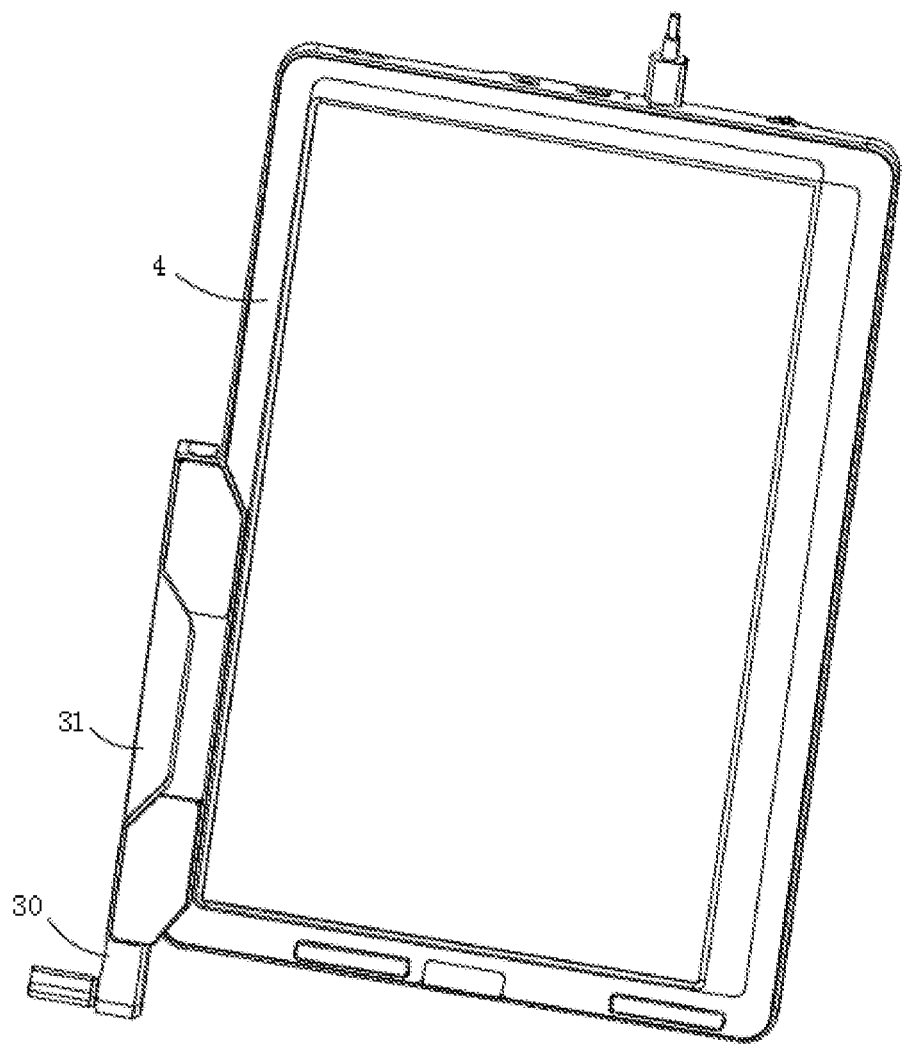
FIG. 9 is a schematic diagram of the screen of the screen extender according to one embodiment of the present disclosure, where the screen is vertically placed for use.
Figure 10:
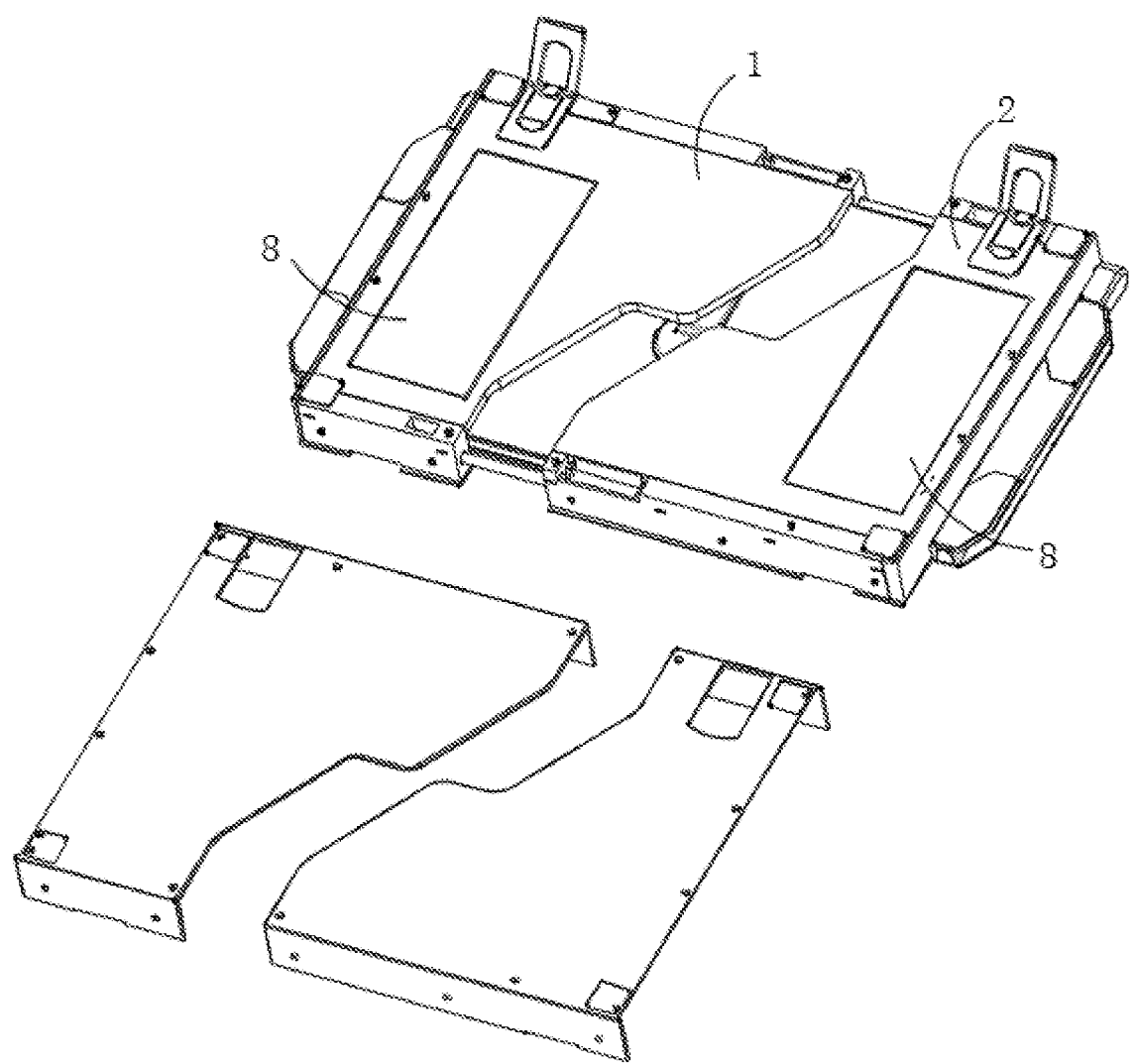
FIG. 10 is an exploded schematic diagram of the screen extender according to one embodiment of the present disclosure.

As shown in FIGS. 1-10, the present disclosure provides a screen extender. The screen extender comprises a first support 1 and a second support 2.

The first support 1 is connected to the second support 2. The first support 1 and the second support 2 are pullable with respect to each other. A first accommodating cavity 10 is defined in the first support 1. A second accommodating cavity 20 is defined in the second support 2. The first accommodating cavity 10 and the second accommodating cavity 20 are combined to form a screen storage chamber. At least one connecting assembly 3 is arranged on at least one of the first support 1 and the second support 2. The at least one connecting assembly 3 is detachably connected to a screen.

In the screen extender, the first accommodating cavity 10 defined by the first support 1 and the second accommodating cavity 20 defined by the second support 2 form the screen storage chamber. When the screen 4 is not in use, the screen is detached from the at least one connecting assembly 3 and put into the screen storage chamber for storage. The first support 1 and the second support 2 are pullable with respect to each other, so the screen storage chamber is adapt to the screens having different sizes. Alternatively, the screen 4 is taken out and installed on the at least one connecting assembly and servers as the screen extender. When used as the screen extender, an overall width of the screen extender is adjusted through the first support 1 and the second support 2. When two screens 4 are respectively installed on the first support 1 and the second support, two connecting assemblies 3 are arranged on the first support 1 and the second support 2, a space between the two screens 4 are adjusted through the first support 1 and the second support 2. An overall structure of the screen extender is reasonable and compact, functions thereof are rich and diverse, and application flexibility thereof is high. Further, it is very convenient to use and store the screen extender, and the screen extender provides good protection for the screens when the screens are received in the screen extender.

It should be noted that the connecting assemblies 3 of the present disclosure are not limited to following connecting structures, and any current screen-detachable structure may be adopt to implement the present solution, which is also within the protection scope of the present disclosure. Similarly, for forms of sliding structures, it is not limited to the following sliding form, other current sliding structures may be used, and a simple replacement based on the principle thereof is also within the protection scope of the present disclosure.

Optionally, sliding rods 50 and sliding grooves 51 are arranged on the first support and the second support. A first sliding rod 50 and a first sliding groove 51 matched with the first sliding rod 50 are arranged on the first support 1. A second sling rod 50 and a second sliding groove 51 matched with the second sliding rod 50 are arranged on the second support 2. The first sliding rod 50 and the first sliding groove 51 form a first unit. The second sliding rod 50 and the second sliding groove 51 form a second unit. The first unit and the second unit are respectively located on two sides of the screen storage chamber. The screen extender has a simple structure, good integrity, and good stability.

In order to provide different sliding gears, gear grooves 501 are defined on an outer surface of each of the sliding rods 50. An elastic positioning piece 52 (e.g., an elastic bead) is arranged on an inner wall of each of the sliding grooves 51. Each elastic positioning piece 52 is configured to be limited in one of the gear grooves 501 of a corresponding sliding rod 50.

Of course, it is understood that the sliding structures may be equivalently replaced with other current gear adjusting structures, such as tightening screws respectively abutting against the sliding rods etc. Such equivalent replacement solutions also fall within the protection scope of the present disclosure.

In order to ensure a storage effect of the screen storage chamber, the first support and the second support are arranged side by side. A side surface of the first support 1 and a side surface of the second support 2 are inclined surfaces. An inclined direction of the side surface of the first support 1 is consistent with an inclined direction of the side surface of the second support 2. The first accommodating cavity 10 and the second accommodating cavity 20 are respectively defined on the two inclined surfaces. By such arrangements, the first sliding groove 51 defined on an edge of the first support 1 and the second sliding groove defined on an edge of the second support 2 are allowed to be long. Moreover, contact areas between the screens 4, the first accommodating cavity 10, and the second accommodating cavity 20 are large.

Furthermore, self-locking buckles 6 are arranged at an inner bottom of the first accommodating cavity 10 and an inner bottom of the second accommodating cavity 20. A locking piece 40 matched with any one of the self-locking buckles 6 is arranged at one end of each of the screens. When storing the screens 4, each of the self-locking buckles 6 is locked with the locking piece of a corresponding screen to complete locking and positioning of the corresponding screen during storage and ensures stability of the storage.

It should be noted that the self-locking buckles may be equivalently replaced by other current locking structures, and such equivalent replacement solutions also fall within the protection scope of the present disclosure.

Optionally, the screen storage chamber is capable of accommodating the screens by stacking the screens along a vertical direction. Correspondingly, the self-locking buckles are vertically distributed, so as to lock and store the screens 4.

Optionally, at least one battery assembly configured to supply power is arranged on the first support and/or the second support. The at least one battery assembly may be in a form of at least one current battery 8 with a power supply connector. The power supply connector may be a power supply line, a contact power supply head, a wireless charging module, etc., and one or more current batteries may be provided. Of course, it should be noted that the at least one battery assembly is not a necessary accessory, and there may be no battery assembly in the screen extender.

In the screen extender, each of the connecting assemblies 3 comprises a connecting base 30 and a connecting arm 31. Each connecting arm 31 is movably connected to a corresponding connecting base 30. Each connecting arm 31 is detachably connected to a corresponding screen 4. Each connecting base 30 is connected to the first support 1 or the second support 2. Each connecting base 30 is horizontally and rotatably connected to the corresponding connecting arm 31 through a first rotating shaft 32. Each connecting base 30 is vertically and rotatably connected to the first support 1 or the second support 2 through a second rotating shaft 33.

In order to switch the screens 4 between a landscape mode and a portrait mode, and in order to rotate the screens freely in a horizontal direction and the vertical direction; each first rotating shaft and each second rotating shaft are provided. Each first rotating shaft and each second rotating shaft are rotated to adjust a rotating angle of each of the screens according to actual needs. Each first rotating shaft and each second rotating shaft are damping rotating shafts to ensure positioning of each of the screens 4 after rotation.

In one optional embodiment, a positioning groove 310 configured to position each of the screens is defined on each connecting arm, one or more hooks 311 are arranged in each positioning groove 310. Each of the screens 4 is hung through the one or more hooks 311. One or more hooking holes 41 matched the one or more hooks 311 are defined on a side surface of each of the screens 4. When mounting each of the screens, each of the screens 4 is inserted into a corresponding positioning groove and is hung on the one or more hooks 311 of the corresponding positioning groove. Therefore, disassembly and assembly of the screens are extremely convenient.

Alternatively, each connecting arm defines a clamping groove configured to clamp each of the screens, and each of the screens is attached to an inner wall of a corresponding clamping groove by static friction force. Each of the screens and the corresponding clamping completely rely on the static friction force for positioning, making position adjustment of each of the screens more flexible. It should be noted that when each clamping groove is provided, each of the screens should overcome the static friction force for the position adjustment, and a relatively large amount of force needs to be applied.

Optionally, at least one bracket 7 is arranged on the first support and/or the second support. The at least one bracket 7 is foldable and unfoldable. The at least one bracket 7 is configured to adjust a position of the screen extender. The at least one bracket may be a kickstand in the prior art. Of course, a support bracket 42 is arranged on a rear side of each of the screens to enhance stability.

Optionally, the first support 1 comprises a first support body 100 and a first support casing 101. The second support 2 comprises a second support body 200 and a second support casing 201. The first accommodating cavity 10 is defined on an upper end of the first support body 100. The first support casing 101 covers the first accommodating cavity 10. The first support casing 101 is detachably connected to the first support body 100. For instance, first support casing 101 is detachably connected to the first support body 100 through magnetic connection (for example, magnets 9 are arranged on the first support body 100), snap connection, etc.

The second accommodating cavity 10 is defined on an upper end of the second support body 200. The second support casing 201 covers the second accommodating cavity 20. The second support casing 201 is detachably connected to the second support body. For instance, the second support casing 201 is detachably connected to the second support body through magnetic connection (for example, magnets 9 are arranged on the second support body 200), snap connection, etc.

By such arrangements, when the screens need to be stored, the first support casing 101 and the second support casing 201 are detached first, and the screens are respectively placed in the first accommodating cavity 10 and the second accommodating cavity 20, then the first support casing 101 and the second support casing 201 are covered. That is, an extra screen storage operation method is created to facilitate storage operations of the screens.

It should be understood that those skilled in the art are able to make improvements or changes based on the above description, and all these improvements and changes should fall within the protection scope of the appended claims of the present disclosure.

What is claimed is:

1. A screen extender, comprising:
a first support, and
a second support;
wherein the first support is connected to the second support; the first support and the second support are pullable with respect to each other; a first accommodating cavity is defined in the first support; a second accommodating cavity is defined in the second support; the first accommodating cavity and the second accommodating cavity are combined to form a screen storage chamber; at least one connecting assembly is arranged on at least one of the first support and the second support; the at least one connecting assembly is detachably connected to a screen;
the first support comprises a first support body and a first support casing; the second support comprises a second support body and a second support casing;
the first accommodating cavity is defined on an upper end of the first support body; the first support casing covers the first accommodating cavity; the first support casing is detachably connected to the first support body;
the second accommodating cavity is defined on an upper end of the second support body; the second support casing covers the second accommodating cavity; the second support casing is detachably connected to the second support body.

2. The screen extender according to claim 1, wherein sliding rods and sliding grooves are arranged on the first support and the second support; a first sliding rod and a first sliding groove matched with the first sliding rod are arranged on the first support; a second sling rod and a second sliding groove matched with the second sliding rod are arranged on the second support; the first sliding rod and the first sliding groove form a first unit; the second sliding rod and the second sliding groove form a second unit; the first unit and the second unit are respectively located on two sides of the screen storage chamber.

3. The screen extender according to claim 2, wherein gear grooves are defined on an outer surface of each of the sliding rods; an elastic positioning piece is arranged on an inner wall of each of the sliding grooves; each elastic positioning piece is configured to be limited in one of the gear grooves of a corresponding sliding rod.

4. The screen extender according to claim 2, wherein the first support and the second support are arranged side by side; a side surface of the first support and a side surface of the second support are inclined surfaces; an inclined direction of the side surface of the first support is consistent with an inclined direction of the side surface of the second support; the first accommodating cavity and the second accommodating cavity are respectively defined on the two inclined surfaces.

5. The screen extender according to claim 4, wherein self-locking buckles are arranged at an inner bottom of the first accommodating cavity and an inner bottom of the second accommodating cavity; a locking piece matched with any one of the self-locking buckles is arranged at one end of the screen; the screen storage chamber is capable of accommodating screens by stacking the screens along a vertical direction.

6. The screen extender according to claim 5, wherein the locking piece is arranged on a side of the screen which is configured to be detachably connected to the at least one connecting assembly.

7. The screen extender according to claim 2, wherein the first accommodating cavity and the second accommodating cavity are distributed along a first direction, each of the first unit and the second unit is located on a respective one of two opposite sides of the screen storage chamber along a second direction, and the first direction is perpendicular to the second direction.

8. The screen extender according to claim 1, wherein at least one battery is arranged on the first support and/or the second support.

9. The screen extender according to claim 1, wherein the at least one connecting assembly comprises a connecting base and a connecting arm; the connecting arm is movably connected to the connecting base; the connecting arm is detachably connected to the screen; the connecting base is connected to the first support or the second support.

10. The screen extender according to claim 9, wherein the connecting base is horizontally and rotatably connected to the connecting arm through a first rotating shaft; the connecting base is vertically and rotatably connected to the first support or the second support through a second rotating shaft.

11. The screen extender according to claim 9, wherein a positioning groove configured to position the screen is defined on the connecting arm, one or more hooks are arranged in the positioning groove; the screen is hung through the one or more hooks; one or more hooking holes matched the one or more hooks are defined on a side surface of the screen.

12. The screen extender according to claim 11, wherein the one or more hooks comprise a plurality of hooks arranged spaced apart from each other and along a length direction of the connecting arm, and the one or more hooking holes comprise a plurality of hooking holes distributed spaced apart from each other and along a width direction of the screen.

13. The screen extender according to claim 1, wherein at least one connecting assembly comprises two connecting assemblies, each of the two connecting assemblies is arranged on a respective one of two opposite sides of the screen storage chamber, and each of the two connecting assemblies is connected to a respective one of the first support and the second support and is rotatable about a length direction of the screen storage chamber relative to the respective one of the first support and the second support.

14. The screen extender according to claim 13, wherein when the screen extender is folded in a storage state, a projection of each of the two connecting assemblies is overlapped with a projection of each of the first support and the second support along the length direction of the screen storage chamber;
when the screen extender is unfolded in a usage state, each of the two connecting assemblies is arranged at a non-zero angle relative to a casing face of a respective one of the first support casing and the second support casing, and the projection of each of the two connecting assemblies is beyond the projection of each of the first support and the second support along the length direction of the screen storage chamber.

15. The screen extender according to claim 1, wherein the screen is arranged with a support bracket, and the support bracket is arranged on a rear side of the screen.

16. The screen extender according to claim 1, wherein at least one of the first support and the second support is arranged with a bracket, the bracket is foldable, and the bracket is configured to adjust a position of the screen extender.

17. The screen extender according to claim 1, wherein each of the first support body and the second support body is arranged with magnets;
the first support casing is detachably connected to the first support body via the magnets on the first support body, and the second support casing is detachably connected to the second support body via the magnets on the second support body.

18. The screen extender according to claim 1, wherein when the screen is received in the screen storage chamber, a portion of the screen is arranged in the first accommodating cavity and another portion of the screen is arranged in the second accommodating cavity.

19. A screen extender, comprising:
a first support, and
a second support;
wherein the first support is connected to the second support; the first support and the second support are pullable with respect to each other; a first accommodating cavity is defined in the first support; a second accommodating cavity is defined in the second support; the first accommodating cavity and the second accommodating cavity are combined to form a screen storage chamber; at least one connecting assembly is arranged on at least one of the first support and the second support; the at least one connecting assembly is detachably connected to a screen;
wherein the at least one connecting assembly comprises a connecting base and a connecting arm; the connecting arm is movably connected to the connecting base; the connecting arm is detachably connected to the screen; the connecting base is connected to the first support or the second support;
wherein the connecting base is horizontally and rotatably connected to the connecting arm through a first rotating shaft; the connecting base is vertically and rotatably connected to the first support or the second support through a second rotating shaft.

20. A screen extender, comprising:
a first support, and
a second support;
wherein the first support is connected to the second support; the first support and the second support are pullable with respect to each other; a first accommodating cavity is defined in the first support; a second accommodating cavity is defined in the second support; the first accommodating cavity and the second accommodating cavity are combined to form a screen storage chamber; at least one connecting assembly is arranged on at least one of the first support and the second support; the at least one connecting assembly is detachably connected to a screen;
wherein self-locking buckles are arranged at an inner bottom of the first accommodating cavity and an inner bottom of the second accommodating cavity; a locking piece matched with any one of the self-locking buckles is arranged at one end of the screen; the screen storage chamber is capable of accommodating screens by stacking the screens along a vertical direction.

* * * * *